3,021,193
PRODUCTION OF SODIUM FLUORIDE

George L. Cunningham, Burtonsville, Md., assignor to W. R. Grace & Co., New York, N.Y., a corporation of Connecticut
No Drawing. Filed Oct. 29, 1958, Ser. No. 770,287
5 Claims. (Cl. 23—88)

This invention relates to the recovery of utilizable values from silicon tetrafluoride-containing gases. In one specific aspect it relates to the recovery of utilizable values from the off-gases of phosphate rock acidulation, as in the production of superphosphate. In another specific aspect, it relates to the utilization of low grade fluorspar in the production of fluorine-containing materials.

In the acidulation of phosphate rock to produce superphosphate fertilizer, the fluorine contained in the rock (of the order of 3%) is liberated as $SiF_4$. If released to the atmosphere, this $SiF_4$ constitutes a hazard to persons in the immediate area and a nuisance to persons living considerable distances from the site of operations. Besides, it represents a considerable economic waste. It is common practice to scrub these off-gases in an absorption tower where the silicon tetrafluoride reacts with water to form fluosilicic acid solution and finely divided silica. Formerly, this acid was neutralized and discarded. More recently, a fair portion of it is sold for fluoridation of municipal water supplies and a small amount is converted into metal silicofluorides for various uses. However, any use to which the material is put is commercially feasible only because the fluorine-containing gas must be treated to avoid its release to the atmosphere. The universal practice is to convert the $SiF_4$ to that particular product which, at the time, is in greatest demand. Thus, a single product must bear the entire cost of the recovery operation.

I have discovered a process whereby it is possible to obtain a number of utilizable products in the recovery of silicon tetrafluoride from acidulation gases and, at the same time, rid the off-gases of this noxious material.

In accordance with the present invention, the silicon tetrafluoride-containing gas is scrubbed in an adsorption tower with water to recover fluosilicic acid, which is later treated with potassium chloride to yield a slurry of potassium silicofluoride in HCl solution. The HCl is driven off and recovered. The potassium silicofluoride slurry is then treated with caustic soda to yield a slurry of sodium fluoride in potassium silicate solution. The solid sodium fluoride is recovered from this solution by the novel steps outlined below to yield pure sodium fluoride and substantially fluorine-free potassium silicate both of which materials, as recovered hereby, are commercially useful.

In practicing the present invention I may start with the off-gases of a phosphate rock acidulation process or I may generate gases solely for use in making fluorine chemicals as by acidulation of silica-contaminated fluorspar with sulfuric acid. The latter embodiment of the present invention provides a method whereby a low-grade fluorspar, which has almost no commercial use, is converted into useful products.

The silicon tetrafluoride-containing gases from whatever source, are passed into an absorption tower where they come into contact with water with the result that the silicon tetrafluoride is converted into fluosilicic acid by the reaction represented by the following equation:

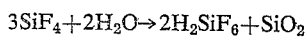
$$3SiF_4 + 2H_2O \rightarrow 2H_2SiF_6 + SiO_2$$

In the present invention, I prefer to operate at high concentrations of fluosilicic acid. For this reason, the absorption step is operated in such way that a concentration of 20–30% fluosilicic acid is obtained. This acid contains a considerable amount of suspended silica, which has no utility in the present invention. Accordingly the acid is filtered to remove such solids before further use.

The filtered fluosilicic acid is then passed into a reactor where either solid potassium chloride or a very concentrated solution thereof is introduced with thorough agitation. This yields a thick slurry of potassium silicofluoride in relatively concentrated HCl solution.

In commercial practice, the fluosilicic acid and potassium chloride are brought together under very dilute conditions to insure the formation of a filterable product. If the solutions are too concentrated, the crystals are very small. In consequence, the product is very difficult to filter and losses are high. The best yields of product are of the order of 75%, the loss being accounted for by product in solution in the waste water and finely divided product suspended in the waste water. Even with dilute solutions, extreme care must be taken in mixing the reactants to insure obtention of a product having the best filterability.

In the present invention, I do not rely on filtration to recover the potassium silicofluoride and am not concerned about careful control of crystal growth. Even so, I can obtain substantially quantitative recovery of fluorine. After the reaction of potassium chloride with fluosilicic acid is complete, I heat the entire mass to evaporate the HCl and water. By use of concentrated reactants, as discussed above, I am able to recover concentrated hydrochloric acid by condensing the vapors driven off by the heating. This hydrochloric acid is relatively strong and is highly pure and has a ready commercial use. The material remaining after liberation of the hydrochloric acid and water is dry potassium fluosilicate.

In a typical commercial process taken from the patent literature, the mother liquor of the potassium silicofluoride step would contain about 26.3 grams HCl per liter. Such dilute acid is not only uneconomical to recover but is practically worthless for industrial uses. Consequently, the common practice is to decant the liquid or filter off the solids and then to neutralize and discard the mother liquor. In accordance with the present invention, the HCl is recovered in pure relatively strong condition. This is possible because there is little or no reversion of the solid product in hot HCl solution. The reaction mass can be heated to relatively high temperatures without appreciable increase in solubility of the solid potassium silicofluoride. This enables me to operate under relatively concentrated conditions.

After removal of the HCl, the solid potassium silicofluoride is treated with concentrated sodium hydroxide. This may be added either as a concentrated solution or as a solid which dissolves in the suspending liquid. It is preferred to use a minimum practical amount of water. Sufficient sodium hydroxide is added to adjust the pH to a value of 8–9. The reaction mass is thoroughly stirred to insure complete reaction, which takes place according to the following equation:

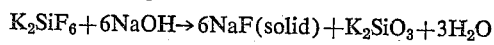
$$K_2SiF_6 + 6NaOH \rightarrow 6NaF(solid) + K_2SiO_3 + 3H_2O$$

The reaction mass at this step comprises solid NaF slurried in potassium silicate solution. The sodium fluoride can be removed by filtration, decantation, or centrifugation. The mother liquor constitutes a solution of potassium silicate containing a fair amount of dissolved sodium fluoride. At this stage, the concentration of sodium fluoride is so high that the potassium silicate is worthless.

In accordance with the present invention the impure potassium silicate solution, to which the wash water from the first filtration step may have been added, is evaporated to concentrate it with respect to potassium silicate and to crystallize additional sodium fluoride. It might be thought best to carry out the evaporation to the maximum desired concentration. However, potassium silicate solutions become more viscous as they become more concentrated and the crystals formed therein are small and poorly formed. Crystallization of sodium fluoride in a relatively viscous potassium silicate solution creates a difficult filtering problem which it is desirable to avoid. It is conceivable that the use of a salt trap, as is sometimes employed in commercial operations, to remove the sodium fluoride as it is formed would permit further evaporation than might be otherwise possible. This might reduce the number of separations required but would not eliminate this step. I prefer to mix the solid sodium fluoride with the filtrate from the preceding filtration. In this way, only the first filter cake is washed with water. This procedure reduces the amount of wash water used to a level that permits adding it back to the system during the first evaporation. In addition, it eliminates the necessity for washing subsequently obtained batches of sodium fluoride crystals. This is particularly desirable in view of the circumstances that the sodium fluoride crystals become smaller in size as the potassium silicate concentration increases. Furthermore, the removal of all of the sodium fluoride from the mother liquor cannot be obtained in a single evaporation. The obtention of a 98.6 to 1.3 potassium silicate to sodium fluoride ratio in the final solution and a 99.1% recovery of sodium fluoride would require evaporation to a solids content of 41%. Even if the evaporation could be carried out to this concentration, the solution would not be readily filtered and the sodium fluoride crystals would be extremely difficult to wash. By the series of step-wise evaporation and filtration steps, impure crystals from the most concentrated silicate solution are given a chance to recrystallize in a less concentrated solution. This not only insures crystals of higher purity but greatly improves the filterability.

The following Example I illustrates more clearly the advantages to be gained by the step-wise evaporation and filtration process according to the present invention.

EXAMPLE I

Several test solutions were run by adding potassium silicofluoride and sodium hydroxide to water at room temperature. After the solution had been thoroughly agitated and allowed to reach equilibrium, the solid was removed by filtration. This solid was sodium fluoride. Based on solubility data obtained, it can be calculated that a solution made from 220.25 gms. of $K_2SiF_6$ and 240 gms. of NaOH in 2160 gms. of water will contain at room temperature 6.07% of NaF, which corresponds to a yield of 63.15% sodium fluoride. The composition of dissolved material is 63.42 parts of potassium silicate to 37.58 parts of sodium fluoride. After heating the mother liquor to evaporate 1440 gms. of water and subsequent cooling, it is possible to remove 64.84 gms. of additional sodium fluoride. The percent solids in the slurry prior to filtration would be approximately 4.0%. At the end of this step, the recovery of sodium fluoride would amount to 88.88% and the composition of the remaining mother liquor approximately 84.6% potassium silicate and 15.3% sodium fluoride. To obtain a recovery of this order in a single step would necessitate evaporating the original slurry to a solids content of approximately 19%. On heating the remaining mother liquor to evaporate approximately 572 gms. of water and subsequent cooling, 25.85 gms. of sodium fluoride can be separated. Prior to separation, the slurry contains approximately 6.7% solids and the ratio of dissolved material in the mother liquor is approximately 98.7% potassium silicate and 1.3% sodium fluoride. The total recovery of sodium fluoride now represents 99.1% of the total possible recovery. In order to obtain a recovery of this magnitude in a single step, it would be necessary to evaporate the original mother liquor to a solids content of 41.1%. Such a slurry would be a semi-solid mass and could hardly be washed free of impurities.

The composition for the above potassium silicate-sodium hydroxide-sodium fluoride system based on solubility data obtained in the present investigation is presented in the following Table 1.

*Table 1*

| Step | Percent Solids in slurry | Composition of liquor—Dry basis | | Yield, NaF | Percent solids in slurries to obtain same yield—not stepwise |
| --- | --- | --- | --- | --- | --- |
| | | $K_2SiO_3$ | NaF | | |
| 220.25 parts $K_2SiF_6$, 240 parts NaOH, 2,160 parts $H_2O$, Filter, 159.15 parts NaF | 6.07 | 62.42 | 37.58 | 63.15 | |
| Evaporate 1,440 parts water, remove 64.84 parts NaF | 4.0 | 84.63 | 15.27 | 88.88 | 18.98 |
| Evaporate 572.3 parts water, remove 25.85 parts NaF | 6.73 | 98.71 | 1.29 | 99.1 | 41.1 |

Although the solubility of sodium fluoride in the present solution decreases as the concentration of potassium silicate increases, the viscosity of the solution increases considerably so that the solid removed by filtration is contaminated with adhering mother liquor. It is known that sodium fluoride crystallizes from strong solutions in relatively small crystals which are very difficult to filter. Adjusting the concentration of this mother liquor by the addition of water reduces the viscosity of the solution but, at the same time, it reduces the size of the crystals already formed and makes filtration even more difficult. In addition, it results in an increased loss of sodium fluoride as dissolved material in the mother liquor. For these reasons, a single concentrating step cannot produce the results obtained by the present step-wise sodium fluoride removal.

The present invention is further illustrated by the following illustrative examples:

EXAMPLE II 264.8 parts of 30% $H_2SiF_6$ solution (79.2 parts $H_2SiF_6$) and 82 parts KCl are added to a vessel and the mixture is gently stirred for a short time. This slurry is evaporated to dryness by removal of 184.8 parts of water and 40.09 parts of HCl. The evolved gases are condensed to yield 224.9 parts of 17.83% hydrochloric acid solution containing only a trace of fluorine and silica. 121 parts of $K_2SiF_6$ are obtained which contain 99.27% $K_2SiF_6$ and 2.02% KCl.

EXAMPLE III 241 parts of 30% $H_2SiF_6$ solution (72.3 parts $H_2SiF_6$) and 58.7 parts of NaCl are added to a vessel and the mixture stirred for a short time. This slurry is evaporated to dryness by removal of 168.7 parts of water and 36.35 parts of HCl. The evolved gases are condensed to yield 205.1 parts of 17.73% hydrochloric acid solution containing only a trace of fluoride and silica. 94.4 parts of $Na_2SiF_6$ are obtained which contain 99.39% $Na_2SiF_6$ and 0.82% NaCl.

EXAMPLE IV 220.25 parts $K_2SiF_6$, 240 parts NaOH and 2160 parts water are heated to near the boiling point with constant stirring. The reaction proceeds smoothly and after cooling to 25° C., the slurry is filtered to remove 159.15 parts NaF. The mother liquor is evaporated to remove 1440 parts water and the slurry is cooled to 25° C. and filtered to remove 64.84 parts NaF. The solution is evaporated to remove 572.3 parts water and is cooled to 25° C. and filtered to remove 25.85 parts NaF. The filtrate contains 154.26 parts $K_2SiO_3$, 2.16 parts NaF and 147.6 parts water. Thus a 99.1% yield of NaF is obtained.

While I do not intend nor desire to limit the scope of the invention by any considerations of the theory, it is believed that when fluosilicic acid is reacted with an alkali metal halide in aqueous solution a reciprocal salt pair solubility system results. At any temperature alkali metal ions, silicofluoride ions, chloride and hydrogen ions are present. Due to the relatively low solubility of sodium and potassium silicofluorides in concentrated hydrochloric acid at 25° C. the concentrations of alkali metal ions and fluosilicate ions are quite low. On raising the temperature to cause the evolution of HCl and water the solubility of the alkali metal fluosilicates is not unduly increased. Since the concentrations of the fluosilicate ions is very small the concentration of fluosilicic acid in the solution is small and hence very little fluosilicic acid is volatilized and the reaction does not reverse to any material extent.

The fluosilicic acid used in the process of this invention can be of any concentration from about 3–4% by weight up to 30% by weight or even more concentrated. It will be obvious to those skilled in the art that the concentration of the resulting hydrochloric acid solution will depend on the concentration of the fluosilicic acid used. For this reason it is preferred to use relatively concentrated solutions of fluosilicic acid.

In the process of this invention the ratio of moles of fluosilicic acid to moles of alkali metal chloride should be 1:2 for maximum yields and purity of the resulting alkali metal silicofluoride and hydrochloric acid. If excess alkali metal chloride is used, the resulting alkali metal silicofluoride will contain the excess alkali metal chloride. If excess fluosilicic acid is used, the excess will be volatilized along with the water and HCl, and will thus tend to contaminate the resulting hydrochloric acid produced.

The water and HCl can be evaporated off the slurry at atmospheric pressure or it may be evaporated off under reduced pressure. If the evaporation is carried out under reduced pressures the temperatures necessary are correspondingly reduced and there is even less reversion of the reaction.

The reaction of potassium silicofluoride in concentrated sodium hydroxide tends to be rather slow at room temperature. Thus it is better to use somewhat more dilute solutions of sodium hydroxide and temperatures approaching the boiling point of the solution. In order to obtain maximum yields of sodium fluoride and produce a solution of potassium silicate low in sodium fluoride content, the solution should be concentrated by evaporation, and cooled to approximately 25° C. before separating the sodium fluoride.

I claim:

1. The method of converting $SiF_4$ in the off-gases of phosphate rock acidulation to utilizable products which comprises absorbing the $SiF_4$ in water to form $H_2SiF_6$ of about 20–30% concentration, filtering said solution to remove insoluble impurities, slowly and with vigorous stirring adding to the filtered $H_2SiF_6$ a stoichiometric quantity of KCl in concentrated form, thereby forming a slurry of potassium fluosilicate in HCl solution, distilling and recovering the HCl, adding to the residue a stoichiometric amount of NaOH, thereby yielding a thick slurry of NaF in potassium silicate solution, filtering the slurry and washing the residue to obtain substantially pure NaF, concentrating the filtrate by evaporation at an elevated temperature to crystallize additional NaF, cooling and filtering the concentrate to remove additional NaF, continuing the alternate concentrating and filtering steps until potassium silicate of desired concentration is obtained, whereby there are obtained substantially pure potassium silicate, hydrochloric acid and sodium fluoride.

2. The method of recovering utilizable values from $SiF_4$-containing gases comprising the steps of absorbing said $SiF_4$ in water to a concentration of 20–30% $H_2SiF_6$, separating undissolved solids from said $H_2SiF_6$, adding thereto sufficient KCl in concentrated form to convert the $H_2SiF_6$ to $K_2SiF_6$ and HCl in solution, heating said solution to distill said HCl and condensing the distillate to recover substantially pure HCl solution, adding to the residual solids a sufficient amount of NaOH to convert the $K_2SiF_6$ to $K_2SiO_3$ in alkaline solution and NaF solids, filtering said solution to recover NaF as a residue, partially evaporating the filtrate to form a concentrate, cooling the concentrate to crystallize additional NaF, separating the crystallized NaF from its mother liquor, and repeating the evaporating, crystallizing and filtering step until the mother liquor has the desired concentration of $K_2SiO_3$, whereby there are obtained substantially pure NaF and concentrated solutions of HCl and $K_2SiO_3$.

3. The method of obtaining substantially pure NaF and concentrated potassium silicate and hydrochloric acid solutions from fluosilicic acid solution comprising the steps of adding to a concentrated solution of fluosilicic acid sufficient KCl in concentrated form to yield a slurry of $K_2SiF_6$ in strong HCl solution, heating the slurry to drive off HCl, recovering the HCl by condensing the vapors, adding to the remaining $K_2SiF_6$ slurry sufficient NaOH to precipitate the fluorine as NaF in potassium silicate solution, separating the solids from the liquid, washing said solids free of adhering liquid, heating said liquid to evaporate water and concentrate said solution to the point of saturation with NaF, cooling said solution to crystallize NaF, separating the solid and washing it free of adhering mother liquid, and repeating the concentrating, cooling and filtering steps until a desired final solution concentration is obtained.

4. The method of obtaining utilizable values from gases containing $SiF_4$ comprising the steps of absorbing the $SiF_4$ in water to form a 20–30% $H_2SiF_6$ solution, filtering said solution to remove insoluble constituents, adding to the filtered solution sufficient concentrated KCl solution to precipitate the fluorine as $K_2SiF_6$, thereby forming a slurry of said $K_2SiF_6$ in water, heating the resulting slurry for sufficient time to drive off the HCl formed by the reaction of $H_2SiF_6$ with KCl, adding to the remaining slurry sufficient concentrated NaOH solution to adjust the pH to a value of 8–9, thereby converting the $K_2SiF_6$ to NaF solids in a solution of potassium silicate, filtering to remove the solid NaF and washing said solid free of adhering mother liquor, heating the filtrate to concentrate it to the point of incipient saturation with NaF, cooling said solution to crystallize additional NaF, filtering to remove said NaF and washing it free of mother liquor, and repeating the evaporation and filtration steps until a final desired silicate concentration is obtained.

5. The method of forming NaF and $K_2SiO_3$ solution in high yield and purity comprising providing a system including a plurality of mixing, concentrating, cooling and filtering steps in sequence, introducing seriatim increments of $K_2SiF_6$ and NaOH reactants into the system and moving said increments therethrough, said method comprising the steps of: (1) mixing $K_2SiF$ with a stoichiometric quantity of NaOH in aqueous medium to form a slurry of NaF in $K_2SiO_3$ solution; (2) admixing therewith the solid NaF recovered from step 8 below; (3) filtering to remove the solid NaF; (4) washing said solid free of mother liquor, thereby obtaining highly pure NaF; (5) adding to the mother liquor the washings from step 4 above and the solid NaF from step 12 below; (6) evaporating therefrom at least a portion of the water; (7) cooling the solution to crystallize additional NaF; (8) filtering to recover the solid NaF and adding said solid NaF to the slurry formed in step 1 above; (9) mixing with the filtrate from step 8 the solid NaF from step 16 below; (10) evaporating at least a portion of the water from the filtrate; (11) cooling the concentrated filtrate to crystallize additional NaF; (12) filtering the cooled concentrate to remove solid NaF and adding it back to the mixed washings and filtrate in step 5 above; (13) mixing wtih the filtrate from step 12 the solid from step subsequent to 16 wherein said solid is separated from the evaporated solution of $K_2SiO_3$; (14) evaporating more water from the slurry to further concentrate it with respect to potassium silicate; (15) cooling the concentrate to crystallize additional NaF; (16) filtering the cooled concentrate and returning the solid NaF to the system at step 9 above; and repeating the sequence defined by steps 9–16 inclusive until the solution reaches the desired concentration with respect to $K_2SiO_3$ and finally removing the concentrated potassium silicate from the system as product.

References Cited in the file of this patent

UNITED STATES PATENTS

| | | |
|---|---|---|
| 1,382,165 | Bishop | June 21, 1921 |
| 1,634,122 | Stevenson | June 28, 1927 |
| 2,865,709 | Horn | Dec. 23, 1958 |

FOREIGN PATENTS

| | | |
|---|---|---|
| 488,709 | France | July 16, 1918 |
| 579,039 | France | July 22, 1924 |
| 1,020,135 | France | Nov. 12, 1952 |

UNITED STATES PATENT OFFICE
CERTIFICATE OF CORRECTION

Patent No. 3,021,193                        February 13, 1962

George L. Cunningham

It is hereby certified that error appears in the above numbered patent requiring correction and that the said Letters Patent should read as corrected below.

Column 6, line 58, for "$K_2SiF$" read -- $K_2SiF_6$ --.

Signed and sealed this 23rd day of October 1962.

(SEAL)
Attest:

ERNEST W. SWIDER
Attesting Officer

DAVID L. LADD
Commissioner of Patents